United States Patent
Schofield (12)

(10) Patent No.: US 7,079,770 B2
(45) Date of Patent: Jul. 18, 2006

(54) SYSTEM AND APPARATUS FOR DROPPING AND ADDING OPTICAL DATA STREAMS IN AN OPTICAL COMMUNICATION NETWORK

(75) Inventor: Bruce A. Schofield, Tyngsboro, MA (US)

(73) Assignee: Nortel Networks Limited (CA)

( * ) Notice: Subject to any disclaimer, the term of this patent is extended or adjusted under 35 U.S.C. 154(b) by 884 days.

(21) Appl. No.: 09/740,706

(22) Filed: Dec. 19, 2000

(65) Prior Publication Data

US 2006/0098982 A1    May 11, 2006

(51) Int. Cl.
*H04J 14/02* (2006.01)
(52) U.S. Cl. .................... 398/83; 398/79; 398/82; 398/84; 398/85; 398/45; 398/48; 398/51; 398/54; 385/16; 385/17; 385/18; 385/24; 385/37
(58) Field of Classification Search ............. 385/17, 385/16, 18, 24, 37; 398/83, 51, 82, 79, 84, 398/85, 45, 54, 48
See application file for complete search history.

(56) References Cited

U.S. PATENT DOCUMENTS

| | | | |
|---|---|---|---|
| 5,889,904 A * | 3/1999 | Pan et al. ................. | 385/24 |
| 6,069,719 A * | 5/2000 | Mizrahi ..................... | 385/24 |
| 6,115,517 A * | 9/2000 | Shiragaki et al. .......... | 385/24 |
| 6,134,047 A * | 10/2000 | Flood et al. ............ | 359/337.12 |
| 6,289,148 B1 * | 9/2001 | Lin et al. .................. | 385/24 |
| 6,411,752 B1 * | 6/2002 | Little et al. ............... | 385/17 |
| 6,445,840 B1 * | 9/2002 | Fernandez et al. ......... | 385/17 |
| 6,449,407 B1 * | 9/2002 | Kiang et al. ............... | 385/18 |
| 6,519,075 B1 * | 2/2003 | Carr et al. ................ | 359/291 |
| 6,525,863 B1 * | 2/2003 | Riza ......................... | 359/290 |
| 6,542,656 B1 * | 4/2003 | Hill .......................... | 385/18 |
| 6,556,739 B1 * | 4/2003 | Kruglick .................. | 385/17 |
| 6,771,905 B1 * | 8/2004 | Bortz ....................... | 398/45 |
| 6,928,244 B1 * | 8/2005 | Goldstein et al. ......... | 398/45 |

* cited by examiner

*Primary Examiner*—Hanh Phan
(74) *Attorney, Agent, or Firm*—McGuinness & Manaras LLP

(57) ABSTRACT

A system and apparatus for dropping and adding optical data streams in an optical communication network uses a photonic switching fabric for dropping but not adding optical data streams, and uses a combiner external to this photonic switching fabric for combining passed optical data streams from the photonic switching fabric together with added optical data streams. The added optical data streams are not limited to the wavelengths of the dropped optical data streams. The photonic switching fabric may be a Micro Electro Mechanical System (MEMS) that uses single-sided mirrors configurable to drop but not add optical data streams.

26 Claims, 6 Drawing Sheets

FIG. 1    100

SYSTEM AND APPARATUS FOR DROPPING AND ADDING OPTICAL DATA STREAMS IN AN OPTICAL COMMUNICATION NETWORK

FIELD OF THE INVENTION

The present invention relates generally to optical networking, and more particularly to dropping and adding optical data streams in an optical communication network.

BACKGROUND OF THE INVENTION

In an optical communication network, an optical data stream is typically produced by modulating an optical carrier based upon a data signal. Multiple optical data streams having different wavelengths are often multiplexed onto a single optical fiber using a technique known as Wavelength Division Multiplexing (WDM). WDM allows a single optical fiber to carry multiple optical data streams.

At various nodes in the optical communication network, it is often necessary or desirable to re-route optical data streams among and between various fibers. For example, certain optical data streams from an incoming fiber may be passed through to an outgoing fiber, while other optical data streams from the incoming fiber are not passed through to the outgoing fiber. For convenience, optical data streams that are pass through from the incoming fiber to the outgoing fiber are referred to hereinafter as "passed" optical data streams, while optical data streams that are not passed through from the incoming fiber to the outgoing fiber are referred to hereinafter as "dropped" optical data streams. Furthermore, new optical data streams may be inserted onto the outgoing fiber. For convenience, such new optical data streams are referred to hereinafter as "added" optical data streams. For convenience, an apparatus that performs such pass, drop, and add functions is often referred to as an optical add/drop multiplexer.

A typical optical add/drop multiplexer includes a demultiplexer for demultiplexing optical data streams from an incoming fiber, an add/drop fabric for performing the add/drop functions, and a multiplexer for multiplexing optical data streams onto an outgoing fiber. Specifically, optical data streams demultiplexed from the incoming fiber are fed as inputs to the add/drop fabric, as are any optical data streams to be added. At each wavelength, the add/drop fabric may be configured to pass the demultiplexed optical data stream, drop the demultiplexed data stream and add a new optical data stream at the same wavelength, or drop the demultiplexed data stream without adding a new optical data stream at the same wavelength. Thus, the added data streams are limited to the wavelengths of the dropped data streams. The multiplexer receives passed and/or added optical data streams from the add/drop fabric, and multiplexes the passed and/or added optical data streams onto the outgoing fiber.

The multiplexer portion of the optical add/drop multiplexer typically includes filter logic that prevents any out-of-band optical data stream from interfering with another optical data stream. Specifically, the filter logic monitors the wavelength of each optical data stream. If the wavelength of a particular optical data stream shifts outside of a predetermined range, the filter logic prevents that optical data stream from being multiplexed onto the outgoing fiber. The wavelength of an optical data stream can shift, for example, due to certain laser failures (e.g., the control voltage applied to the laser). While this filter logic prevents interference between optical data streams, it also adds cost and complexity to the optical add/drop multiplexer.

SUMMARY OF THE INVENTION

In accordance with one aspect of the invention, a drop-only fabric is used in combination with an external combiner so that added optical data streams are not limited to the same wavelengths as dropped optical data streams.

In accordance with another aspect of the invention, the drop-only fabric is a drop-only Micro Electro Mechanical System (MEMS) that is capable of dropping but not adding optical data streams. Specifically, the drop-only MEMS includes single-sided mirrors configurable to drop but not add optical data streams.

In accordance with another aspect of the invention, the combiner is a passive coupler that combines passed optical data streams from the drop-only fabric together with the added optical data streams. In-band control of the added optical data streams is performed externally to the combiner.

In accordance with another aspect of the invention, the combiner includes filter logic for blocking out-of-band optical data streams.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

Figure 1:
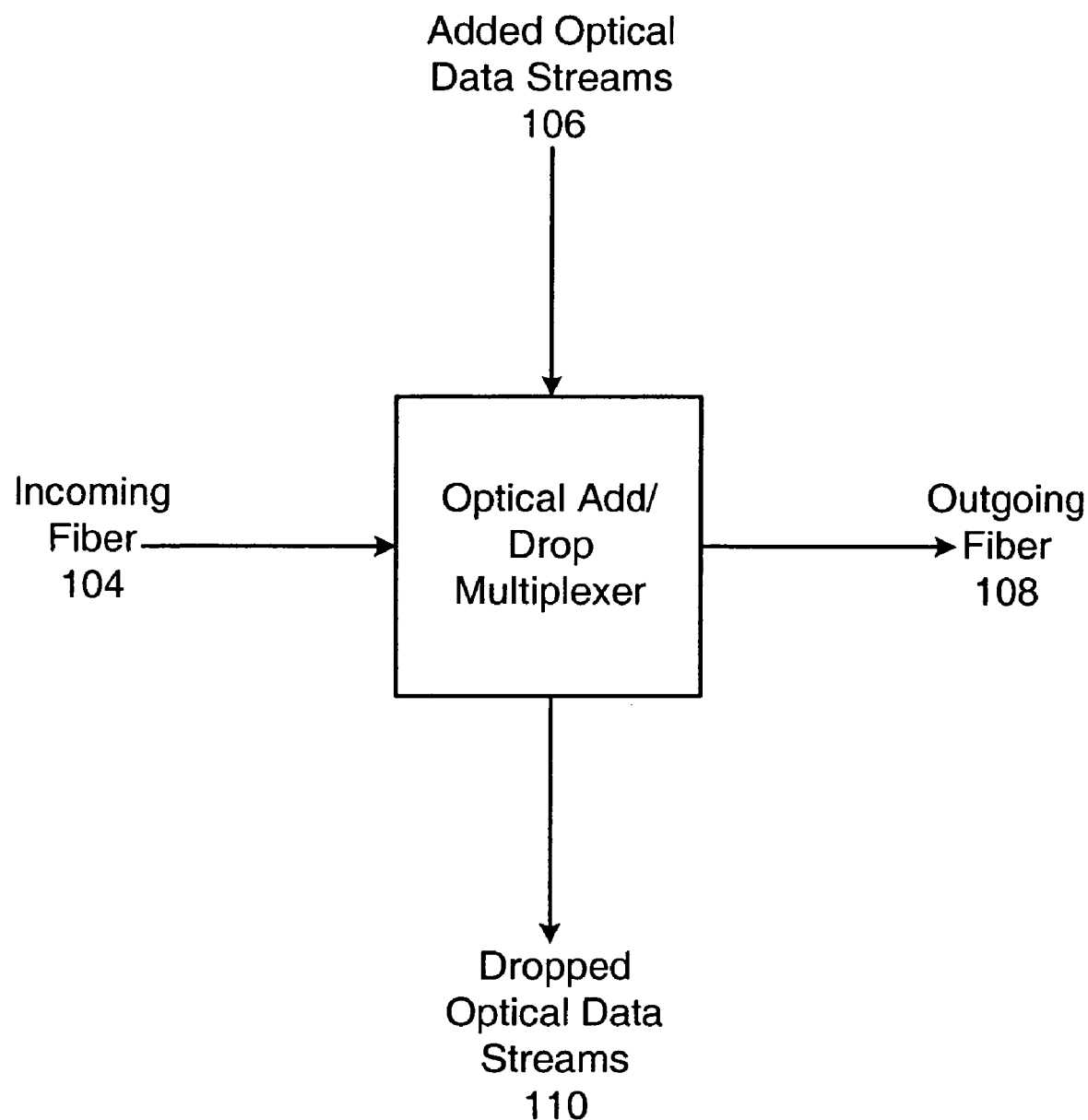
FIG. 1 shows an exemplary optical communication system including an optical add/drop multiplexer for performing add/drop functions.

As described above, at various nodes in the optical communication network, it is often necessary or desirable to re-route optical data streams among and between various fibers. For example, certain optical data streams from an incoming fiber may be passed through to an outgoing fiber, while other optical data streams from the incoming fiber are not passed through to the outgoing fiber. For convenience, optical data streams that are pass through from the incoming fiber to the outgoing fiber are referred to hereinafter as "passed" optical data streams, while optical data streams that are not passed through from the incoming fiber to the outgoing fiber are referred to hereinafter as "dropped" optical data streams. Furthermore, new optical data streams may be inserted onto the outgoing fiber. For convenience, such new optical data streams are referred to hereinafter as "added" optical data streams. For convenience, an apparatus that performs such pass, drop, and add functions is often referred to as an optical add/drop multiplexer.

In an embodiment of the present invention, an optical add/drop multiplexer uses a photonic switching fabric for dropping, but not adding, optical data streams, and uses a combiner external to this drop-only fabric for combining passed optical data streams together with any added optical data streams onto the outgoing fiber. The combiner enables the optical add/drop multiplexer to add optical data streams at any wavelength. Therefore, the added optical data streams are not limited to the wavelengths of the dropped optical data streams.

The drop-only fabric may use any of a variety of photonic switching technologies, including Micro Electro Mechanical System (MEMS) technology, Micro Opto Electro Mechanical System (MOEMS) technology, bubble (champagne) technology, lithium niobate technology, liquid crystal technology, or other photonic switching technology.

In a drop-only fabric based upon MEMS or MOEMS technology, the drop-only fabric preferably includes single-sided mirrors that can be configured to drop but not add optical data streams. The use of single-sided mirrors within such a drop-only fabric substantially reduces the cost and complexity of the optical add/drop multiplexer vis-a-vis an add/drop fabric that uses double sided mirrors or double-mirror combinations. Similar reductions in cost and complexity can be realized in drop-only fabrics based upon other photonic switching technologies.

In order to perform an add/drop function, optical data streams demultiplexed from the incoming fiber are fed as inputs to the drop-only fabric. At each wavelength, the drop-only fabric may be configured to pass the demultiplexed optical data stream or drop the demultiplexed data stream. The combiner receives the passed optical data streams from the drop-only fabric as well as any new optical data streams to be added. The combiner combines the passed optical data streams from the drop-only fabric together with the added optical data streams onto the outgoing fiber.

The combiner is typically a passive coupler that does not include filter logic for preventing interference between the passed and added optical data streams. Thus, using the combiner in lieu of a multiplexer with filter logic substantially reduces the cost and complexity of the optical add/drop multiplexer. In order to ensure that out-of-band added optical data streams do not interfere with the passed optical data streams (or other added optical data streams), each added optical data stream typically uses external control logic to ensure that the wavelength remains within a predetermined range.

FIG. 1 shows an exemplary optical communication system 100 including an optical add/drop multiplexer 102 for performing add/drop functions. The optical add/drop multiplexer 102 has inputs including the incoming fiber 104 and the new optical data streams 106 to be added, and outputs including the outgoing fiber 108 and the dropped optical data streams 110. Specifically, the optical add/drop multiplexer 102 is coupled between the incoming fiber 104 and the outgoing fiber 108. The new optical data streams 106 to be added are fed into the optical add/drop multipler 102. The optical add/drop multiplexer 102 demultiplexes the optical data streams from the incoming fiber 104 and performs the appropriate pass, drop, and add functions to output the dropped optical data streams 110 and output the passed optical data streams together with the added optical data streams over the outgoing fiber 108.

Figure 2:
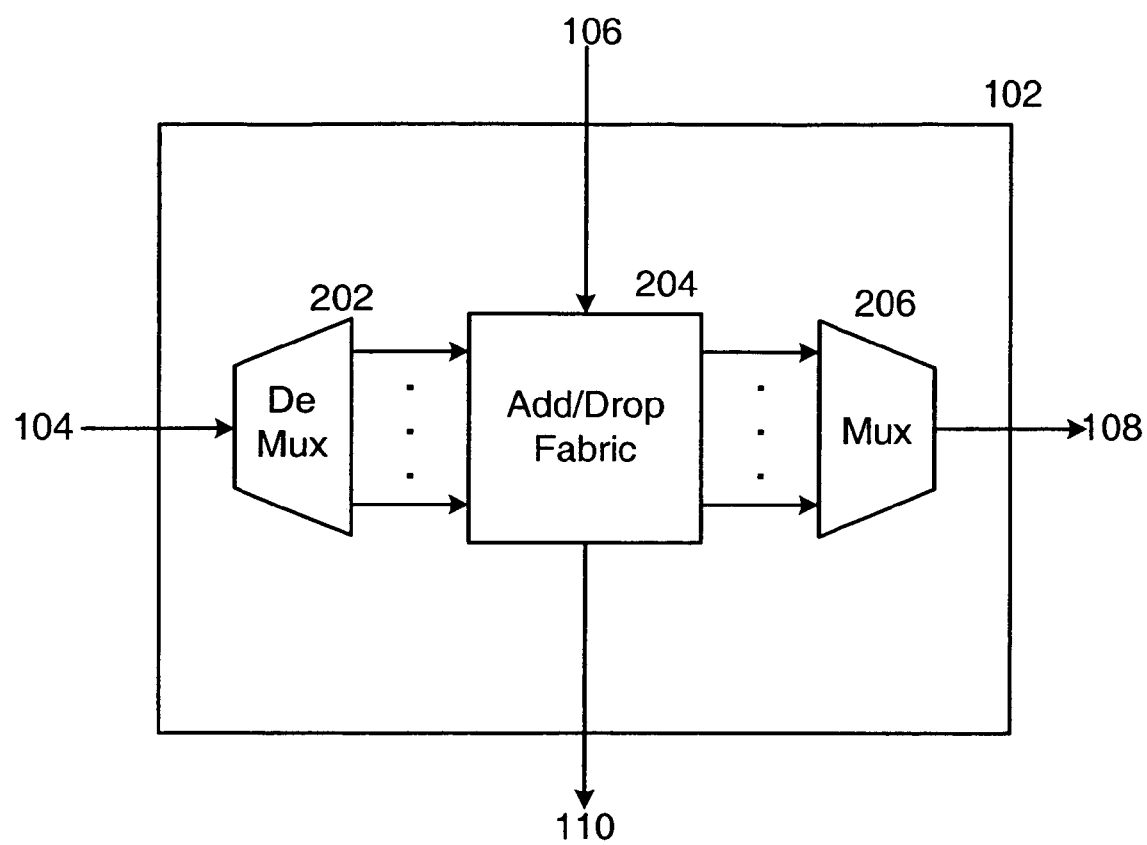
FIG. 2 is a block diagram showing the relevant components of an exemplary optical add/drop multiplexer including a demultiplexer, an add/drop MEMS having double-sided mirrors or double-mirror combinations, and a multiplexer as known in the art.

FIG. 2 shows the relevant components of an exemplary optical add/drop multiplexer 102 as known in the art. Among other things, the optical add/drop multiplexer 102 includes a demultiplexer 202, an add/drop fabric 204, and a multiplexer 206. The demultiplexer 202 demultiplexes the optical data streams from the incoming fiber 104 and provides the demultiplexed optical data streams to the add/drop fabric 204. The add/drop fabric 204 receives the demultiplexed optical data streams from the demultiplexer 202 as well as the new optical data streams 106 to be added. At each wavelength, the add/drop fabric 204 is configured to either pass the demultiplexed optical data stream, drop the demultiplexed data stream and add a new optical data stream 106 at the same wavelength, or drop the demultiplexed data stream without adding a new optical data stream at the same wavelength. The multiplexer 206 receives the passed optical data streams and the added optical data streams 106 from the add/drop fabric 204. The multiplexer 206 multiplexes the passed optical data streams and the added optical data streams 106 onto the outgoing fiber 108. The multiplexer 206 typically includes filter logic for blocking any of the passed optical data streams or added optical data streams 106 that shift outside of a predetermined wavelength range. In such an embodiment, the added optical data streams 106 are limited to the wavelengths of the dropped optical data streams 110 due to limitations of the add drop fabric 204.

In an exemplary embodiment, the add/drop fabric 204 is based upon MEMS or MOEMS technology that uses mirrors to drop an optical data stream at a particular wavelength and/or add an optical data stream at a particular wavelength. At each drop/add point within the MEMS/MOEMS, a double-sided mirror or double-mirror combination is typically used for dropping/adding optical data streams at a particular wavelength. This use of a double-sided mirror or double-mirror combination at each drop/add point enables an optical data stream to be dropped and a new optical data stream to be added at each wavelength. Unfortunately, with this configuration, it is only possible for the optical add/drop multiplexer to add optical data streams at the same wavelengths as the dropped optical data streams. Furthermore, the use of a double-sided mirror or double-mirror combination at each drop/add point increases the complexity and the cost of the optical add/drop multiplexer.

Figure 3:
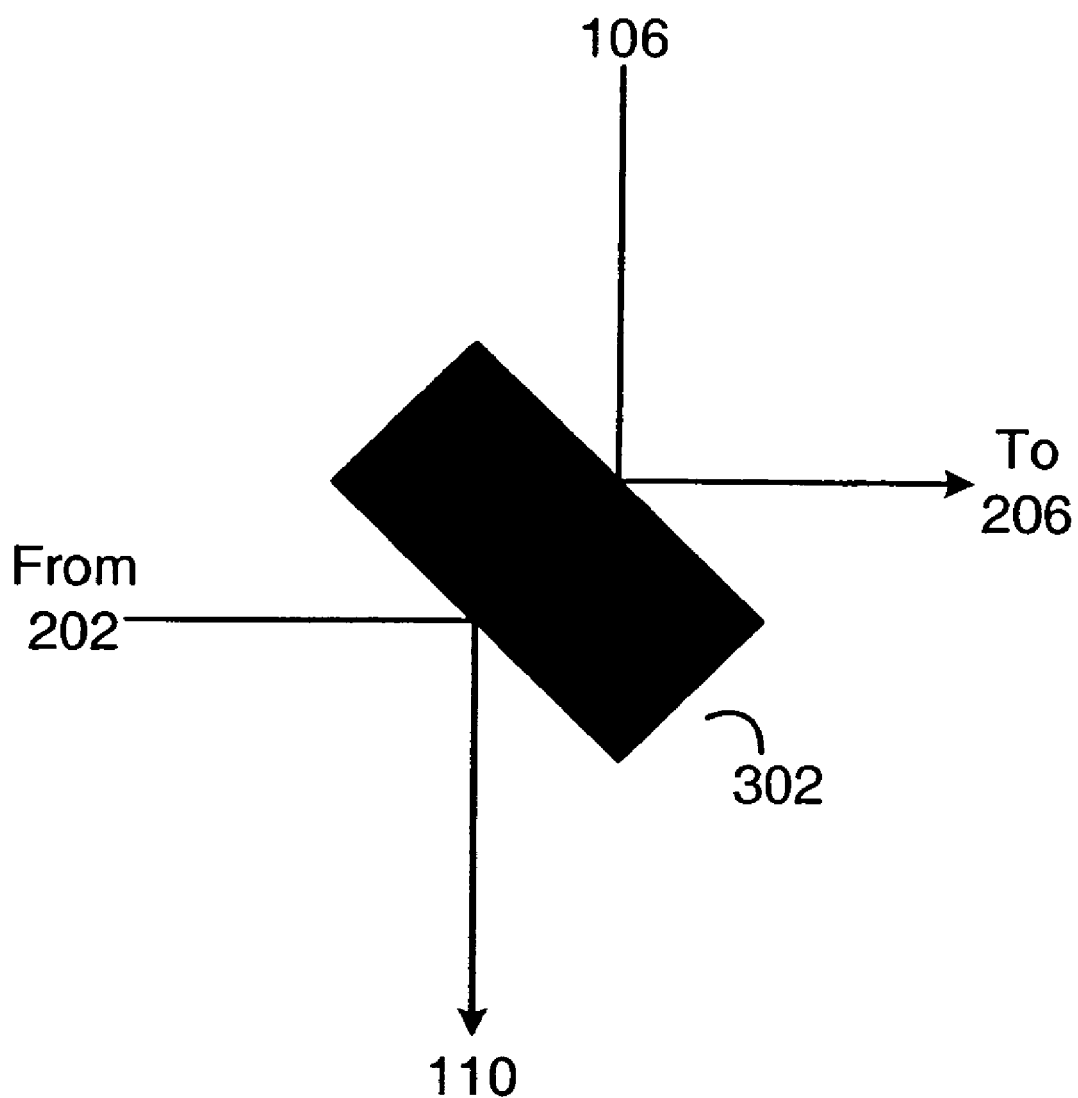
FIG. 3 shows a representation of a drop/add point within the add/drop MEMS in which a double-sided mirror is configured to drop and add optical data streams at a particular wavelength as known in the art.

FIG. 3 shows a representation of a drop/add point 300 with the add/drop fabric 204 in which a double-sided mirror 302 is configured to drop and add optical data streams at a particular wavelength. Specifically, a demultiplexed optical data stream received from demultiplexer 202 is deflected by the double-sided mirror 302 to become a dropped optical data stream 110, and a new optical data stream 106 is deflected by the double-sided mirror 302 to become an added optical data stream that is sent to the multiplexer 206.

Figure 4:
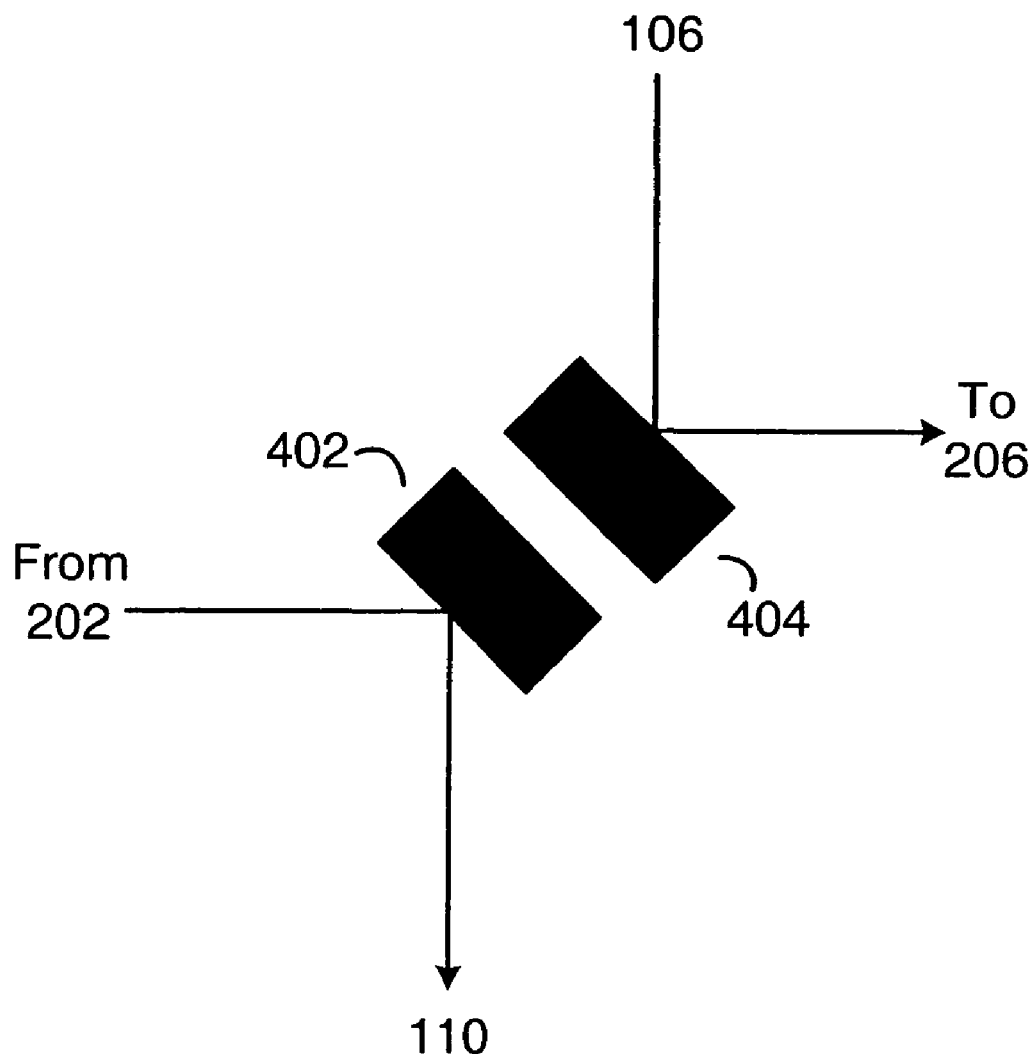
FIG. 4 shows a representation of a drop/add point within the add/drop MEMS in which a double-mirror combination including a drop mirror and an add mirror is configured to drop and add optical data streams at a particular wavelength as known in the art.

FIG. 4 shows a representation of a drop/add point 400 within the add/drop fabric 204 in which a double-mirror combination including a drop mirror 402 and an add mirror 404 is configured to drop and add optical data streams at a particular wavelength. Specifically, a demultiplexed optical data stream received from demultiplexer 202 is deflected by the drop mirror 402 to become a dropped optical data stream 110, and a new optical data stream 106 is deflected by the add mirror 404 to become an added optical data stream that is sent to the multiplexer 206.

In an embodiment of the invention, the added optical data streams 106 are not limited to the same wavelengths of the dropped optical data streams. This is because a drop-only fabric performs only the drop function, and a combiner external to the drop-only fabric is used to perform the add function.

Figure 5:
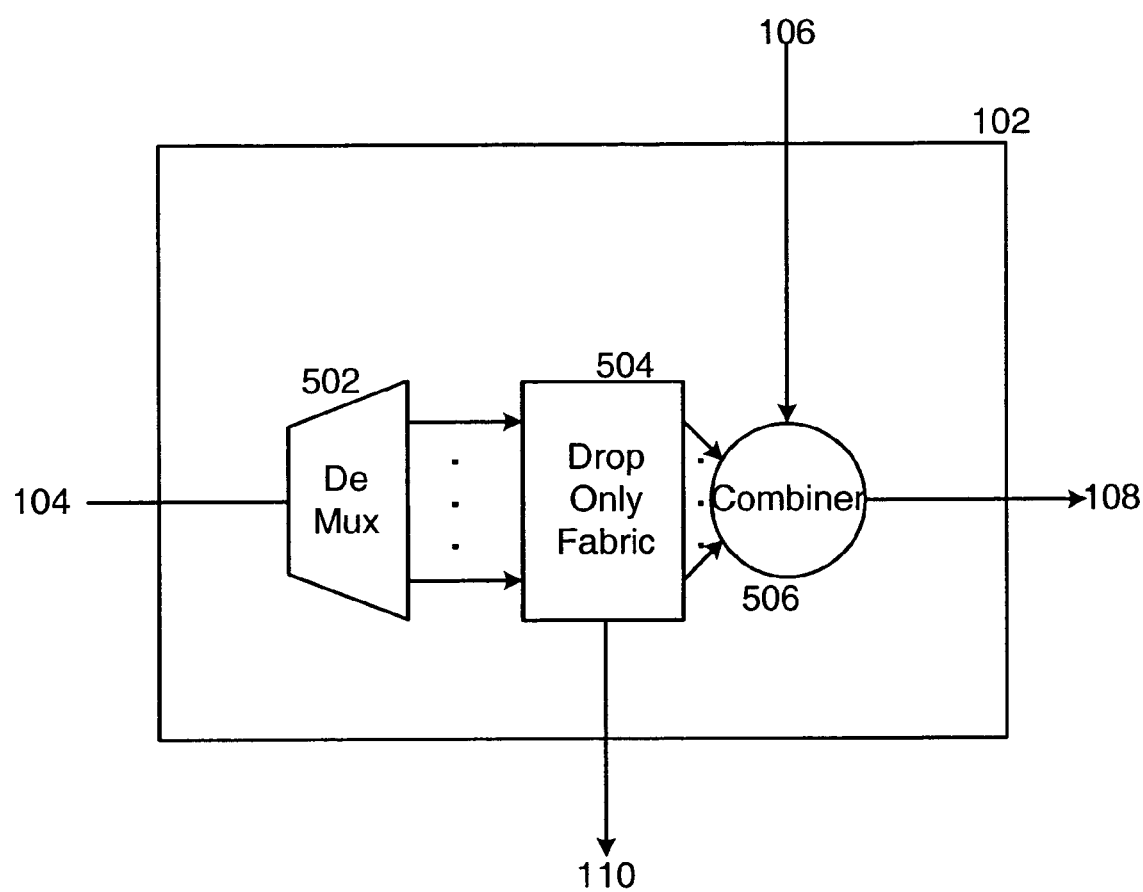
FIG. 5 shows the relevant components of an exemplary optical add/drop multiplexer including a demultiplexer, a drop-only MEMS having single-sided mirrors, and a combiner in accordance with an embodiment of the present invention.

FIG. 5 shows the relevant components of an exemplary optical add/drop multiplexer 102 in an embodiment of the present invention. Among other things, the optical add/drop multiplexer 102 includes a demultiplexer 502, a drop-only fabric 504, and a combiner 506. The demultiplexer 502 demultiplexes the optical data streams from the incoming fiber 104 and provides the demultiplexed optical data streams to the drop-only fabric 504. The drop-only fabric 504 receives the demultiplexed optical data streams from the demultiplexer 502 but not the new optical data streams 106 to be added. At each wavelength, the drop-only fabric 504 is configured to either pass the demultiplexed optical data stream or drop the demultiplexed data stream. The combiner 506 receives the passed optical data streams from the drop-only fabric 504 and also receives the added optical data streams 106. The combiner 506 combines the passed optical data streams and the added optical data streams 106 onto the outgoing fiber 108.

In an exemplary embodiment of the invention, the drop-only fabric 504 is based upon MEMS or MOEMS technology that uses single-sided mirrors to drop but not add optical data streams. Specifically, a single-sided mirror is positioned at each drop point within the MEMS/MOEMS. At each drop point, the single-sided mirror can be configured to drop the optical data stream or pass the optical data stream.

Figure 6:
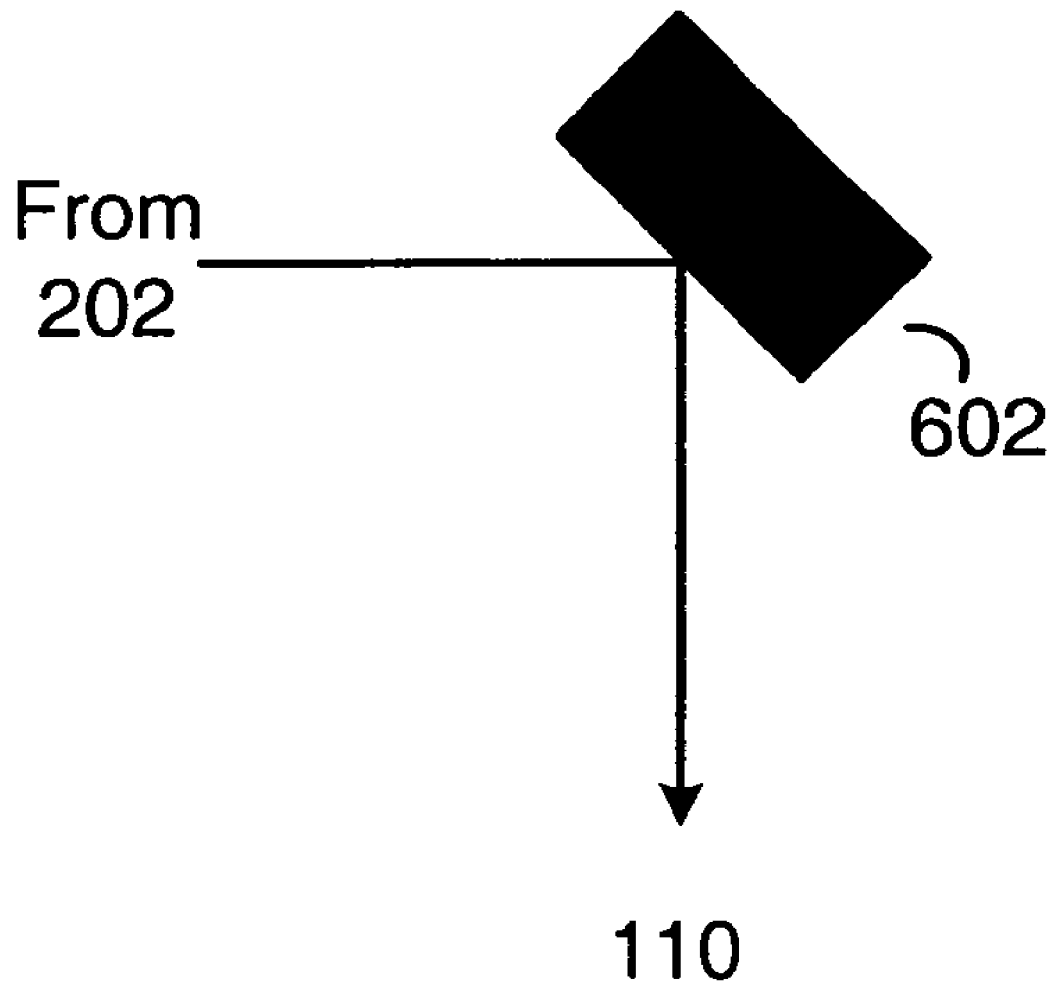
FIG. 6 shows a representation of a drop point within the drop-only MEMS in which a single-sided mirror is configured to drop an optical data stream at a particular wavelength in accordance with an embodiment of the present invention.

FIG. 6 shows a representation of a drop point 600 within the drop-only fabric 504 in which a single-sided mirror 602 is configured to drop an optical data stream at a particular wavelength. Specifically, a demultiplexed optical data stream received from demultiplexer 502 is deflected by the single-sided mirror 602 to become a dropped optical data stream 110. In this case, no optical data stream is passed by the drop-only fabric 504 to the combiner 506 at the dropped wavelength.

It should be noted that, while the photonic switching fabric is only used for dropping optical data streams in an embodiment of the present invention, the photonic switching fabric itself is not limited to an architecture that is only capable of dropping optical data streams. Thus, for example, an add/drop fabric may be used in an embodiment of the present invention, in which case the add/drop fabric is coupled and configured so as to drop but not add optical data streams. In this case, new optical data streams are added by the combiner externally to the add/drop fabric.

Although the combiner preferably is a passive coupler that does not include filter logic, the present invention is in no way limited to such a combiner. The combiner may be an active coupler with filter logic, such as a multiplexer.

The present invention may be embodied in other specific forms without departing from the true scope of the invention. The described embodiments are to be considered in all respects only as illustrative and not restrictive.

What is claimed is:

1. An optical add/drop multiplexing apparatus comprising:
 a Micro Electro Mechanical System ("MEMS") based photonic switching fabric operably coupled to drop but not add optical data streams wherein the photonic switching fabric comprises single-sided mirrors configurable to drop but not add optical data streams; and
 a non-MEMS based combiner operably coupled to combine passed optical data streams from the photonic switching fabric together with added optical data streams.

2. The optical add/drop multiplexing apparatus of claim 1, wherein the added optical data streams are not limited to the wavelengths of the dropped optical data streams.

3. The optical add/drop multiplexing apparatus of claim 1, wherein the combiner is a passive coupler.

4. The optical add/drop multiplexing apparatus of claim 1, wherein the combiner comprises filter logic for blocking an out-of-band optical data stream.

5. The optical add/drop multiplexing apparatus of claim 1, further comprising a demultiplexer operably coupled to demultiplex optical data streams from an incoming fiber and provide the demultiplexed optical data streams as inputs to the photonic switching fabric.

6. The optical add/drop multiplexing apparatus of claim 1, wherein the photonic switching fabric is operably coupled to output the dropped optical data streams separately from the passed optical data streams.

7. An optical add/drop multiplexing system comprising:
 a Micro Electro Mechanical System ("MEMS") based photonic switching fabric operably coupled to drop but not add optical data streams, wherein the photonic switching fabric comprises single-sided mirrors configurable to drop but not add optical data streams; and
 a non-MEMS based combiner operably coupled to combine passed optical data streams from the photonic switching fabric together with added optical data streams.

8. The optical add/drop multiplexing system of claim 7, wherein the added optical data streams are not limited to the wavelengths of the dropped optical data streams.

9. The optical add/drop multiplexing system of claim 7, wherein the combiner is a passive coupler.

10. The optical add/drop multiplexing system of claim 7, wherein the combiner comprises filter logic for blocking an out-of-band optical data stream.

11. The optical add/drop multiplexing system of claim 7, further comprising a demultiplexer operably coupled to demultiplex optical data streams from an incoming fiber and provide the demultiplexed optical data streams as inputs to the photonic switching fabric.

12. The optical add/drop multiplexing system of claim 7, wherein the photonic switching fabric is operably coupled to output the dropped optical data streams separately from the passed optical data streams.

13. The optical add/drop multiplexing system of claim 7, wherein each added optical data stream is maintained in-band using controls external to the combiner.

14. Apparatus comprising:
 a Micro Electro Mechanical System (MEMS) capable of dropping but not adding optical data streams, the MEMS comprising single-sided mirrors configurable to drop but not add optical data streams and a non-MEMS based combiner operably coupled to combine passed optical data streams from the MEMs together with added optical data streams which are not from the MEMS, wherein the combiner comprises filter logic for blocking an out-of-band optical data stream.

15. An optical add/drop multiplexing apparatus comprising:
 a Micro Electro Mechanical System ("MEMS") based photonic switching fabric operably coupled to drop but not add optical data streams, wherein the photonic switching fabric comprises single-sided mirrors configurable to drop but not add optical data streams; and a non-MEMS based combiner operably coupled to combine passed optical data streams from the photonic switching fabric together with added optical data streams which are not from the photonic switching fabric wherein the combiner comprises filter logic for blocking an out-of-band optical data stream.

16. The optical add/drop multiplexing apparatus of claim 15, wherein the added optical data streams are not limited to the wavelengths of the dropped optical data streams.

17. The optical add/drop multiplexing apparatus of claim 15, wherein the combiner is a passive coupler.

18. The optical add/drop multiplexing apparatus of claim 15, further comprising a demultiplexer operably coupled to demultiplex optical data streams from an incoming fiber and provide the demultiplexed optical data streams as inputs to the photonic switching fabric.

19. The optical add/drop multiplexing apparatus of claim 15, wherein the photonic switching fabric is operably coupled to output the dropped optical data streams separately from the passed optical data streams.

20. An optical add/drop multiplexing system comprising:
a Micro Electro Mechanical System ("MEMS") based photonic switching fabric operably coupled to drop but not add optical data streams, wherein the photonic switching fabric comprises single-sided mirrors configurable to drop but not add optical data streams; and
a non-MEMS based combiner operably coupled to combine passed optical data streams from the photonic switching fabric together with added optical data streams which are not from the photonic switching fabric wherein the combiner comprises filter logic for blocking an out-of-band optical data stream.

21. The optical add/drop multiplexing system of claim 20, wherein the added optical data streams are not limited to the wavelengths of the dropped optical data streams.

22. The optical add/drop multiplexing system of claim 20 wherein the combiner is a passive coupler.

23. The optical add/drop multiplexing system of claim 20, further comprising a demultiplexer operably coupled to demultiplex optical data streams from an incoming fiber and provide the demultiplexed optical data streams as inputs to the photonic switching fabric.

24. The optical add/drop multiplexing system of claim 20, wherein the photonic switching fabric is operably coupled to output the dropped optical data streams separately from the passed optical data streams.

25. The optical add/drop multiplexing system of claim 20, wherein each added optical data stream is maintained in-band using controls external to the combiner.

26. Apparatus comprising:
a Micro Electro Mechanical System (MEMS) capable of dropping but not adding optical data streams, the MEMS comprising single-sided mirrors configurable to drop but not add optical data streams and a non-MEMS based passive coupler operably coupled to combine passed optical data streams from the MEMs together with added optical data streams which are not from the MEMS, wherein the passive coupler comprises filter logic for blocking an out-of-band optical data stream.

* * * * *